No. 671,529. Patented Apr. 9, 1901.
W. S. SWIFT.
MEAT PRESS.
(Application filed June 2, 1900.)
(No Model.)
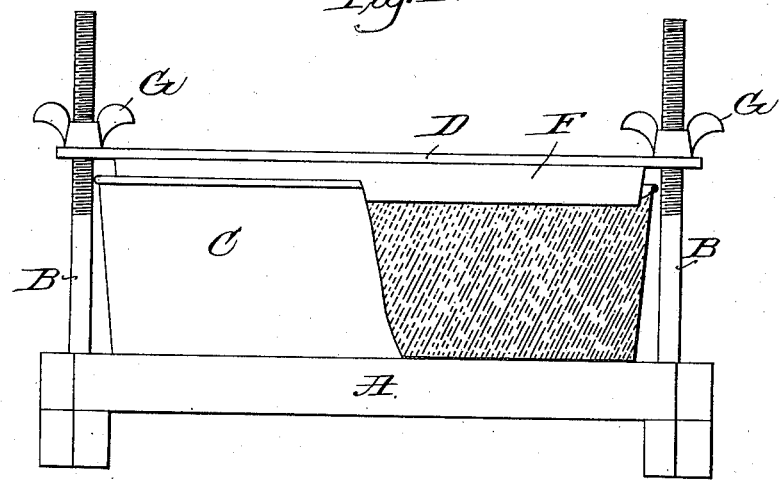
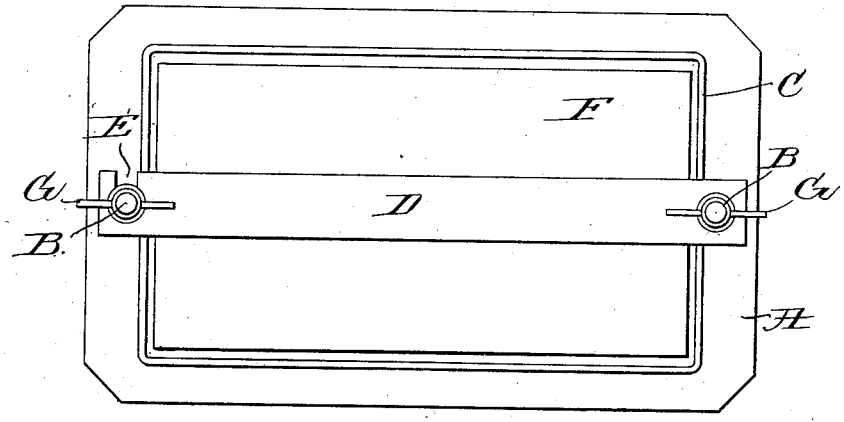
Witnesses:
Alfred H. Hildreth
Christiana Kitching
Inventor:
Willis S. Swift
by his attorney,
Benjamin Phillips
THE NORRIS PETERS CO., PHOTO-LITHO., WASHINGTON, D. C.

UNITED STATES PATENT OFFICE.

WILLIS S. SWIFT, OF GLOUCESTER, MASSACHUSETTS, ASSIGNOR OF ONE-HALF TO CHARLES W. ROBINSON, OF SAME PLACE.

MEAT-PRESS.

SPECIFICATION forming part of Letters Patent No. 671,529, dated April 9, 1901.

Application filed June 2, 1900. Serial No. 18,829. (No model.)

*To all whom it may concern:*

Be it known that I, WILLIS S. SWIFT, a citizen of the United States, residing at Gloucester, in the county of Essex and State of Massachusetts, have invented certain new and useful Improvements in Meat-Presses; and I do hereby declare the following to be a full, clear, and exact description of the invention, such as will enable others skilled in the art to which it appertains to make and use the same.

The present invention relates to an improvement in meat-presses. Heretofore as such presses have been constructed the mold has been of a particular size and shape and adapted for use only in the press for which it was designed. Consequently the amount of meat that could be pressed varied between narrow limits. Moreover, the pressure was applied at the center of the platen by means of a screw mounted in a cross-head or bail extending across the mold, a method that often resulted in the uneven pressing of the meat on account of the tilting of the platen. The cross-head was also liable to be broken by the heavy pressure that must needs be exerted. In that style of press where the platen was made of metal in order to withstand the piercing action of the single screw there was the further objection that the meat which came in contact with the platen was discolored by contact with the metal.

The object of the present invention is to provide a cheap and durable meat-press in which almost any size and shape of mold may be used and in which the wooden platen is forced down evenly and squarely.

To the above end the present invention consists in the combinations hereinafter described and claimed.

In the accompanying drawings, illustrating the preferred form of my invention, Figure 1 is a side view of my improved meat-press, a portion of the side of the mold being broken away; and Fig. 2 is a top plan view of the same.

In the illustrated embodiment of my invention A represents a frame or base which may be of any material and of any desired size and shape, but which is preferably of wood and of the shape shown. Rigidly secured in said base A are the uprights B B, screw-threaded at their upper ends.

C is the mold and is supported on the base A between the uprights. In this connection it will be noted that a mold of a particular size and shape is not required in my press, any baking-tin or pan that may be placed between the uprights either lengthwise or sidewise being available. Thus a pan may be chosen for a mold which shall correspond to the amount of meat to be pressed or to the shape desired, a feature which is absent in all the prior presses, so far as I know the art.

D represents the wide flat metal presser-bar, pivotally secured at one end to one of the uprights, while a notch or slot E at the other end is adapted to receive the other upright. A wooden platen F, corresponding in size and shape to the mold, is arranged to be forced downward by the bar D to press the meat, said bar being depressed by the thumb-screws G G on the threaded uprights.

It will be observed that by the above construction the platen F is carried down evenly and squarely, the width of the bar D being sufficient to prevent any tilting sidewise, while tilting endwise is impossible by reason of the application of the pressure at both ends. The meat will therefore be pressed into a regular and symmetrical form, a result by no means assured in the prior presses. Moreover, the bar D is not liable to break on account of its contact throughout nearly its entire length with the platen P.

The operation of my improved meat-press is as follows: A pan or baking-tin of the desired size and shape and containing the meat to be pressed is placed between the uprights, the platen put on top, and the bar swung about its pivot to engage the other upright. The thumb-screws may now be turned down to any desired extent, forcing down the bar and platen and pressing the meat. After sufficient time has elapsed the thumb-screws may be loosened slightly and the bar swung back, the platen taken out, and the mold and its contents removed.

Having thus described my invention, I claim as new and desire to secure by Letters Patent of the United States—

A meat-press having, in combination, a base, two screw-threaded uprights secured therein, a mold supported on said base, a wooden platen corresponding in shape to the mold, a wide flat presser-bar loosely pivoted at one end on one of said uprights, and provided at the other end with a notch to embrace the other upright and adapted to be swung to and away therefrom about the first upright when it is desired to close and open the press, and thumb-screws on said uprights adapted to engage the presser-bar and to force it downward and to maintain said bar and the platen level, substantially as described.

In testimony whereof I affix my signature in presence of two witnesses.

WILLIS S. SWIFT.

Witnesses:
RICHARD TUFTS,
DANIEL S. ARRELL.